United States Patent [19]

Feutrel

[11] 4,347,966
[45] Sep. 7, 1982

[54] METHOD FOR FIXING A GUIDE TUBE OF A NUCLEAR REACTOR FUEL ASSEMBLY

[75] Inventor: Claude Feutrel, Vauhallan, France

[73] Assignee: Commissariat a l'Energie Atomique, Paris, France

[21] Appl. No.: 157,827

[22] Filed: Jun. 9, 1980

[30] Foreign Application Priority Data

Jun. 14, 1979 [FR] France .................. 79 15272

[51] Int. Cl.³ .................. B23K 33/00; F16L 41/08
[52] U.S. Cl. .................. 228/173 F; 29/157.4; 29/525; 228/175; 228/183; 376/451
[58] Field of Search .......... 228/183, 175, 170, 173 F; 29/509, 525, 157.4 R; 285/158, 382.4; 176/78

[56] References Cited

U.S. PATENT DOCUMENTS

| | | | |
|---|---|---|---|
| 2,271,652 | 2/1942 | Languard et al. | 285/158 X |
| 2,457,633 | 12/1948 | Borg | 285/382 X |
| 3,018,547 | 1/1962 | Markell | 29/507 |
| 3,437,357 | 4/1969 | Rubin | 285/158 X |
| 4,174,123 | 11/1979 | Schluderberg | 285/158 X |
| 4,208,248 | 6/1980 | Jabsen | 176/78 |

FOREIGN PATENT DOCUMENTS

| | | |
|---|---|---|
| 2742692 | 4/1979 | Fed. Rep. of Germany . |
| 1450315 | 7/1966 | France . |
| 2070194 | 9/1971 | France . |
| 2078256 | 11/1971 | France . |
| 2078392 | 11/1971 | France . |
| 2171279 | 9/1973 | France . |
| 2368785 | 5/1978 | France . |

Primary Examiner—Gil Weidenfeld
Assistant Examiner—K. J. Ramsey

[57] ABSTRACT

Method for fixing a zircalloy guide tube of a nuclear reactor fuel assembly to the steel end plate of said assembly, wherein the following stages are successively formed:

the previously expanded end of the guide tube is engaged around a sleeve until it abuts against a first outer shoulder of said sleeves;

said end is covered with a force-fitted ferrule and the tube is squeezed against the sleeve, then the upper end of the ferrule is welded to the sleeve above the said first outer shoulder;

the sleeve—tube—ferrule assembly is introduced into an opening provided for this purpose in the end plate and having a shoulder, until a second outer shoulder of the sleeve abuts against the said shoulder of the end plate opening;

the upper part of the sleeve is welded to the upper part of the opening of the end plate of the assembly.

The invention also relates to an apparatus for fixing the zircalloy guide tube to the steel end plate.

1 Claim, 1 Drawing Figure

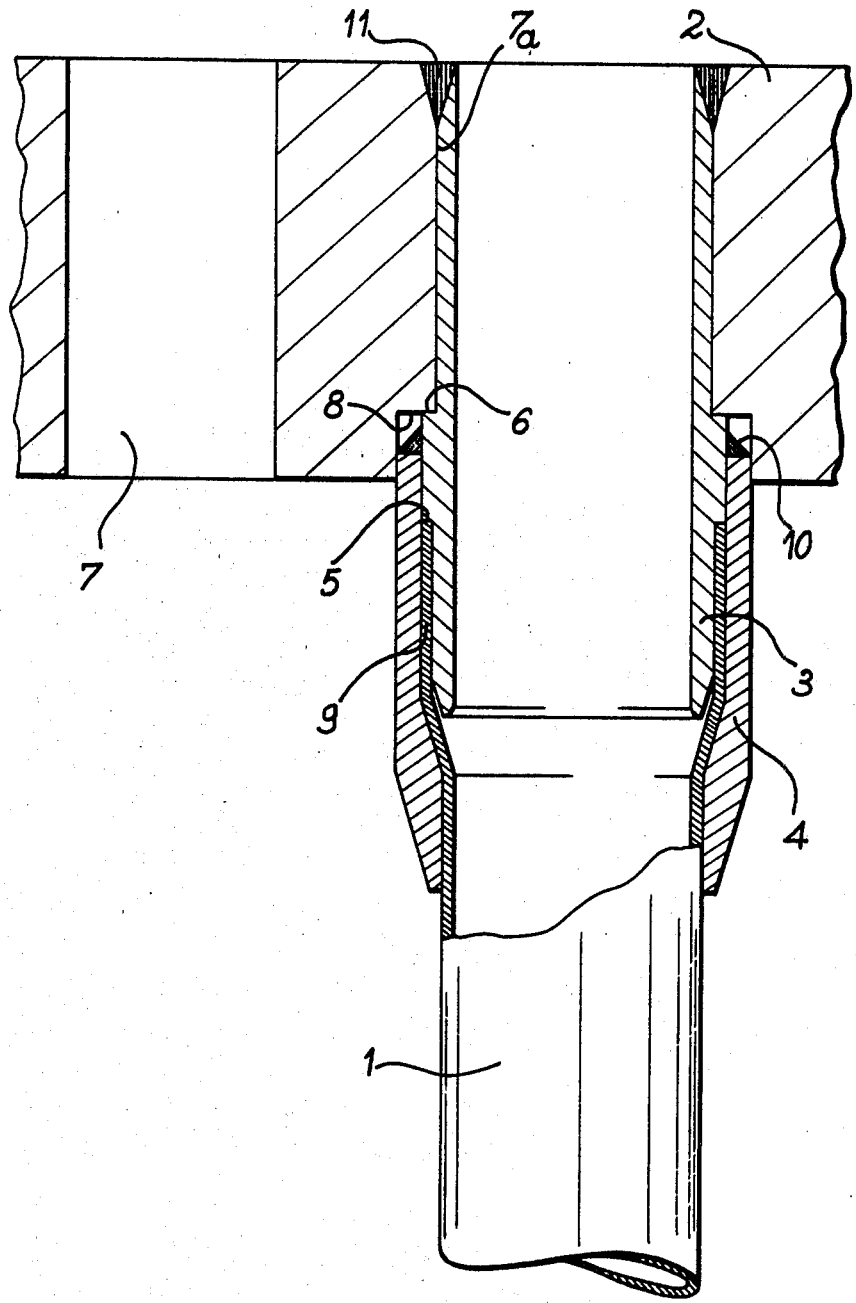

METHOD FOR FIXING A GUIDE TUBE OF A NUCLEAR REACTOR FUEL ASSEMBLY

BACKGROUND OF THE INVENTION

The present invention relates to fuel assemblies for nuclear reactors, for example of the ordinary water-cooled PWR type in which the actual fuel in the form of a large number of unit rods is grouped into autonomous bundles, each constituting a fuel assembly. As is known, such an assembly has an upper and a lower end plate interconnected by hollow guide tubes, which can particularly serve for the introduction of control rods or measuring devices. To these different guide tubes are generally fixed spacing grids which can sometimes freely slide about said guide tubes and in which are fixed the unit fuel rods by means of a spring system.

In known manner, the end plates are made from stainless steel and the guide tubes are made from zircalloy alloy which is permeable to the flux of neutrons traversing them.

As it is impossible to weld zircalloy to stainless steel, hitherto the guide tubes have been fixed to the stainless steel end plates by means of force fitting systems having undulations for preventing the longitudinal sliding of the tube in its support. However, such systems have a very poor resistance to the differential expansions between the different connecting members when the reactor temperature rises. Almost invariably, these expansions lead to both diametral and longitudinal deformations, so that at the end of a relatively short operating period the connection quality is impaired.

BRIEF SUMMARY OF THE INVENTION

The present invention relates to a method for fixing such a guide tube to the end plate of a nuclear fuel assembly making it possible to ensure a durable and firm joint by using particularly simple and easily usable means.

According to the invention, this method involves the succession of the following stages:
the previously expanded end of the guide tube is engaged around a sleeve until it abuts against a first outer shoulder of said sleeve;
said end is covered with a force-fitted ferrule and the tube is squeezed against the sleeve, then the upper end of the ferrule is welded to the sleeve above the said first outer shoulder;
the sleeve-tube-ferrule assembly is introduced into an opening provided for this purpose in the end plate and having a shoulder, until a second outer shoulder of the sleeve abuts against the said shoulder of the end plate opening;
the upper part of the sleeve is welded to the upper part of the opening of the end plate of the assembly.

Thus, the method according to the invention, is to lead to a rigid connection of the zircalloy guide tube to the end plate of the stainless steel assembly, whilst obviating any differential expansion between the connecting members, both with regard to diametral deformation and with regard to longitudinal deformations, because the different connecting components abut against one another and because welds are used for the final fixing thereof.

The invention also relates to an apparatus for fixing a guide tube to the end plate of a nuclear reactor fuel assembly, wherein:
a sleeve provided with two outer shoulders;
a ferrule force-fitted to the sleeve, welded to the latter and squeezing the expanded end of the guide tube engaged on the sleeve up to a first outer shoulder;
an opening in the end plate provided with a shoulder in which is located the said sleeve, whose second shoulder abuts against the shoulder of the upper plate, the upper end of the sleeve being welded to the upper part of the opening of the end plate of the assembly.

DESCRIPTION OF THE DRAWING AND PREFERRED EMBODIMENTS

A better understanding will be obtained of the invention from the following description relative to an embodiment of the method of fixing a guide tube of a fuel assembly to the end plate of said assembly, with reference to the attached drawing.

The drawing shows a zircalloy guide tube 1 and a stainless steel end plate 2 of a fuel assembly of a PWR-type nuclear reactor. According to the invention, the guide tube 1 is force-fitted between a stainless steel sleeve 3 and a stainless steel ferrule 4. The outer surface of the sleeve 3 carries two shoulders, one in a lower position 5 and the other in an upper position 6. The upper end plate 2 has a certain number of openings 7, whereof one in particular, namely opening 7a traverses it from one side to the other and has a shoulder 8 in its lower part.

The method of fixing the guide tube 1 to the upper end plate 2 involves the following stages.

Firstly, the upper expanded end 9 of the tube is engaged around the lower part of sleeve 3 until the upper end of the tube 1 engages with the shoulder 5 of sleeve 3. The assembly is then covered by a stainless steel ferrule 4, so as to force fit the end 9 of tube 1 between sleeve 3 and ferrule 4. This operation of fitting the ferrule 4 is, for example, performed by means of a screw pushing means. Thus, the ferrule 4 is fitted to the sleeve 3, up to the vicinity of its second upper shoulder 6 and is finally welded to the sleeve 3 by an annular weld 10. At this time, tube 1, sleeve 3, and ferrule 4 form an assembly which is introduced into the opening 7a of the upper end plate 2 until the second outer shoulder 6 of sleeve 3 abuts with the shoulder 8 of openings 7a of upper end plate 2. When this takes place, the upper end of sleeve 3 is level with the surface of the upper end plate 2 and the annular weld bead 11 makes it possible to fix sleeve 3, i.e. at the same time as tube 1 and ferrule 4 to the upper end plate 2.

It is easy to see that the thus constructed connecting apparatus completely reliably ensures the fixing of tube 1 to plate 2, whilst opposing any deformation of the latter in the longitudinal direction due to the various shoulders limiting the possible reciprocal displacements of the parts and in the diametral direction by the fact that the ferrule 4 which is also fixed to the sleeve 3 totally covers the upper expanded part of guide tube 1.

What is claimed is:
1. A method for fixing a zircalloy guide tube of a nuclear reactor fuel assembly to the steel end plate of said assembly, wherein the following steps are successively performed:
expanding one end of the guide tube;
engaging the expanded end of the guide tube around a sleeve provided with first and second outer shoul- ders until it abuts against the first outer shoulder of said sleeve;

covering said end with a force-fitted ferrule and squeezing the tube against the sleeve, then welding the upper end of the ferrule to the sleeve above the said first outer shoulder;

introducing the sleeve-tube-ferrule assembly into an opening adapted to receive the same in the end plate, said opening also having a shoulder, until said second outer shoulder of the sleeve abuts against the said shoulder of the end plate opening:

and welding the upper part of the sleeve to the upper part of the opening of the end plate of the assembly.

* * * * *